(12) United States Patent
Olson et al.

(10) Patent No.: US 9,890,857 B2
(45) Date of Patent: Feb. 13, 2018

(54) CVT AND METHOD FOR MITIGATING VARIATOR GROSS SLIP OF THE SAME

(71) Applicant: GM GLOBAL TECHNOLOGY OPERATIONS LLC, Detroit, MI (US)

(72) Inventors: Bret M. Olson, White Lake, MI (US); Ronald W. VanDiepen, Ann Arbor, MI (US); Paul G. Otanez, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 167 days.

(21) Appl. No.: 14/977,986

(22) Filed: Dec. 22, 2015

(65) Prior Publication Data

US 2017/0175886 A1  Jun. 22, 2017

(51) Int. Cl.
*F16H 9/18* (2006.01)
*F16H 61/662* (2006.01)

(52) U.S. Cl.
CPC ......... *F16H 61/66272* (2013.01); *F16H 9/18* (2013.01); *F16H 61/66231* (2013.01); *F16H 2061/66277* (2013.01)

(58) Field of Classification Search
None
See application file for complete search history.

(56) References Cited

U.S. PATENT DOCUMENTS

| 6,602,160 B2* | 8/2003 | Tsutsui | F16H 61/66272 474/28 |
| 7,229,382 B2* | 6/2007 | Oshita | B60W 10/06 477/44 |
| 7,267,632 B2* | 9/2007 | Ochiai | B60W 10/06 477/107 |
| 8,914,203 B2* | 12/2014 | Kodama | F16H 61/66272 477/45 |
| 9,212,742 B2* | 12/2015 | Doihara | B60W 10/06 |

FOREIGN PATENT DOCUMENTS

EP    2261536 A2 * 12/2010  ............ B60W 10/06

* cited by examiner

*Primary Examiner* — Dirk Wright
(74) *Attorney, Agent, or Firm* — Quinn IP Law

(57) ABSTRACT

A continuously variable transmission (CVT) includes an input member, an output member, a variator assembly having a primary variator pulley operable for receiving an input torque via the input member, a secondary variator pulley operable for transmitting an output torque via the output member, and an endless rotatable drive element in frictional engagement with the primary and secondary variator pulleys, first and second speed sensors operable for measuring a respective rotational speed of the primary and secondary variator pulleys, and a controller. The controller executes a method to detect gross slip of the endless rotatable drive element with respect to the primary and secondary variator pulleys using the measured rotational speeds, and in response to the detected gross slip, to request a reduction in the input torque by a calculated amount over a calibrated duration until a level of the detected gross slip reaches a calibrated slip level.

15 Claims, 3 Drawing Sheets

CVT AND METHOD FOR MITIGATING VARIATOR GROSS SLIP OF THE SAME

TECHNICAL FIELD

The present disclosure pertains to a continuously variable transmission (CVT) and a method for mitigating variator gross slip of the same.

BACKGROUND

A continuously variable transmission (CVT) is a type of power transmission that is capable of achieving infinite variability within a calibrated range of speed ratios. Unlike conventionally-geared transmissions that use one or more planetary gear sets and multiple rotating and braking friction clutches to establish a discrete gear state, a CVT uses a variable-diameter pulley system. The pulley system, which is commonly referred to as a variator assembly, can transition anywhere within the calibrated range of speed ratios.

A typical variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and input gear set, and thus acts as a driving/primary pulley. The other pulley is connected via additional gear sets to an output shaft of the CVT and thus acts as a driven/secondary pulley. One or more planetary gear sets may be used on the input or output sides of the variator assembly depending on the configuration.

In order to vary a CVT speed ratio, a clamping force is applied to the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This in turn changes the effective diameters of the variator pulleys and varies the speed ratio of the CVT.

SUMMARY

A system is disclosed herein having a continuously variable transmission (CVT) and a controller programmed to mitigate the effects of gross slip of the CVT. The CVT includes an endless rotatable drive element, e.g., a drive chain or belt, and a variator assembly of the type described above. The controller manages clamping forces of variator pulleys during normal operation of the CVT to achieve a desired speed or torque ratio. However, at times the endless rotatable drive element may slip with respect to the variator pulleys. The variator surfaces are specifically machined to provide a friction surface that engages the endless rotatable drive element. The controller is programmed to automatically execute steps of an associated control method so as to mitigate the effects of the gross variator slip, and to thereby prevent wear at interfacing surfaces of the endless rotatable drive element and the variator pulleys.

In an example embodiment, the CVT includes an input member, an output member, a variator assembly, first and second speed sensors, and a controller. The variator assembly includes a primary variator pulley operable for receiving an input torque via the input member, e.g., from an engine, a secondary variator pulley operable for transmitting an output torque via the output member, and an endless rotatable drive element in frictional engagement with the primary and secondary variator pulleys. The speed sensors are operable for measuring a respective rotational speed of the primary and secondary variator pulleys.

The controller in this embodiment is programmed to detect gross slip of the endless rotatable drive element with respect to the primary and secondary variator pulleys using the measured rotational speeds, and in response to the detected slip, to request a reduction in the input torque by a calculated amount over a calibrated duration until a level of the detected gross slip reaches a calibrated slip level.

At the onset of the gross slip event, the controller decreases the torque capacity ratio by increasing a clamping force on the pulleys by a calibrated amount, such as through an increase in a clamp torque offset. The torque capacity ratio is thereafter smoothly returned to a calibrated level at a predetermined rate.

Concurrently with the above-noted control actions, the controller temporarily disables feedback-based ratio control of the CVT to allow such actions to be implemented.

Additionally, a lookup table may be updated after a calibrated number of occurrences of gross variator slip at a given speed ratio. This action is intended to increase a clamp torque offset in a band of variator speed ratios around that at which the gross slip has occurred. The clamp torque offset is then applied during normal CVT operation when the variator speed ratio is again in the affected range. After a predetermined number of gross slip events at a particular speed ratio, the controller may exclude such speed ratios from consideration. A fault code may be recorded in memory of the controller indicating that the particular speed ratio is unavailable, or requesting service of the CVT.

The above noted and other features and advantages of the present disclosure are readily apparent from the following detailed description when taken in connection with the accompanying drawings.

DETAILED DESCRIPTION

Figure 1:
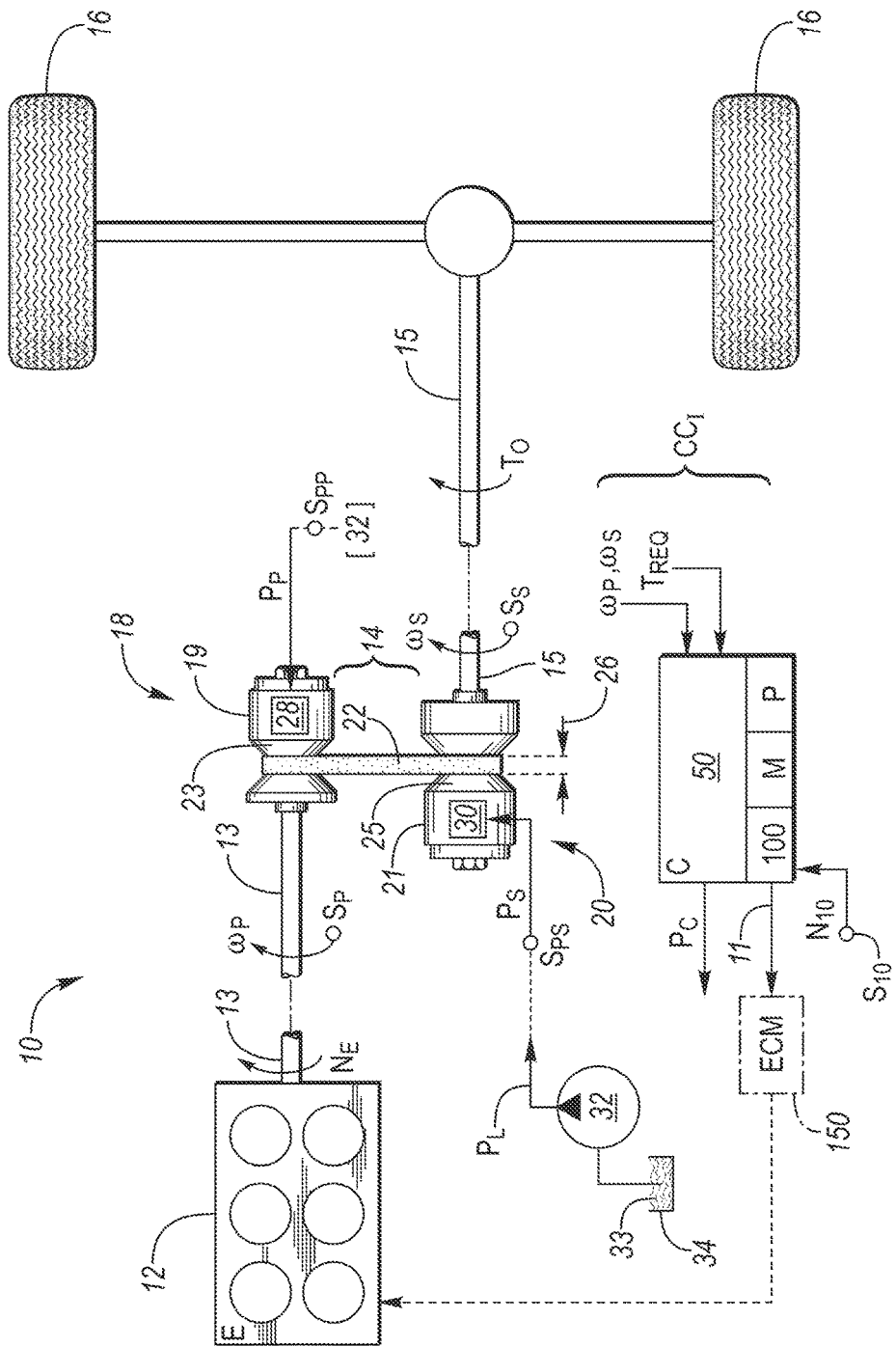
FIG. 1 is a schematic illustration of an example vehicle having a continuously variable transmission (CVT) having a variator assembly and a controller programmed to mitigate a gross slip event of the variator assembly.

Referring to the drawings, wherein like reference numbers correspond to like or similar components throughout the several figures, a vehicle 10 is shown schematically in FIG. 1. The vehicle 10 includes a torque generating device 12, shown as an example internal combustion engine (E), but which may be embodied as an electric machine or other device operable for generating output torque. For illustrative consistency, the torque generating device 12 will be described hereinafter as an engine 12 without limiting the scope to such a design.

The vehicle 10 also includes a continuously variable transmission (CVT) 14 and a controller (C) 50. As set forth below in further detail with reference FIGS. 2 and 3, the controller 50 is programmed to calculate a current speed ratio of the CVT 14, to detect a gross slip event of the CVT 14, and to mitigate the effects of such a gross slip event of the CVT 14 via control actions. The CVT 14 is embodied as or includes a variator assembly having primary and secondary variator pulleys 18 and 20. The pulleys 18 and 20 have respective primary and secondary pulley speeds $\omega_P$ and $\omega_S$ that are measurable via speed sensors $S_P$ and $S_S$, with the variator pulleys 18 and 20 responsive to clamping pressure signals (arrow $P_C$) transmitted by the controller 50. Alternatively, sensors could be located in other locations and configurations, as long as the speeds of the pulleys 18 and 20 can be derived, e.g., wheel speeds could be measured and used in place of the secondary speed sensor $S_S$. As part of the method 100, the controller 50 continuously or periodically calculates the current CVT speed ratio (SR), where $$SR = \frac{\omega_S}{\omega_P},$$

and uses the calculated CVT speed ratio to detect a gross slip event of the CVT 14. Those of ordinary skill in the art will appreciate that the speed ratio could be the inverse, i.e., $$\frac{\omega_P}{\omega_S},$$

or torque ratio could be used within the scope of the present disclosure.

With respect to the example vehicle 10 of FIG. 1, the engine 12 includes a crankshaft 13E. The crankshaft 13E is connected to an input member 13 of the CVT 14, e.g., via an input clutch or hydrodynamic torque converter (not shown). An output member 15 of the CVT 14 ultimately delivers output torque (arrow $T_O$) to a set of drive wheels 16. The CVT 14 includes the primary variator pulley 18, which is connected to and driven by the crankshaft 13E, the secondary variator pulley 20 which is connected to the output member 15, and a continuous rotating drive element 22, i.e., any closed/endless loop of rubber and/or metal such as a chain or belt that is suitable for transmitting torque from the primary variator pulley 18 to the secondary variator pulley 20. The variator pulleys 18 and 20, along with the drive element 22, constitute a variator assembly of the CVT 14. As used herein, the term "gross slip event" and "gross variator slip" refers to slippage of the drive element 22 with respect to the pulleys 18 and/or 20.

The primary and secondary variator pulleys 18 and 20 each have mating halves 19 and 21, respectively, with respective conical faces 23 and 25 defining a variable-width gap 26. The drive element 22 positioned within the variable-width gap 26 rides on the conical faces 23 and 25 as the engine 12 powers the primary pulley 18 at engine speed ($N_E$), which thus acts as the input speed/primary speed ($\omega_P$) of the primary pulley 18. The secondary pulley 20 rotates at the secondary speed ($\omega_S$). As noted above, both pulley speeds ($\omega_P$, $\omega_S$) may be measured via the sensors $S_P$ and $S_S$ and reported to the controller 50, for instance as signals over a controller area network or other suitable channels.

The width of the variable-width gap 26 may be varied via movement of the mating halves 19 and/or 21 so as to change the current speed ratio of the CVT 14. Therefore, the vehicle 10 includes respective first and second variator actuators 28 and 30, shown schematically in FIG. 1, each responsive to primary and secondary clamping pressures (arrows $P_P$ and $P_S$ respectively) measurable via corresponding pulley pressure sensors ($S_{PP}$, $S_{PS}$) to change the position of the respective primary and secondary pulleys 18 and 20. A spring (not shown) can be included within each of the variator pulleys 18 and 20. An example embodiment of the first and second actuators 28 and 30 includes a hydraulic piston/cylinder system, although other linear actuators may be used such as electromechanical devices or pneumatic pistons.

The first variator actuator 28 acts on a moveable one of the mating halves 19 of the primary variator pulley 18 in response to application of the primary clamping pressure (arrow $P_P$). Likewise, the second variator actuator 30 acts on a moveable one of the mating halves 21 of the secondary variator pulley 20 in response to the secondary clamping pressure (arrow $P_S$). Line pressure (arrow $P_L$) may be provided to the CVT 14 via a fluid pump 32, with the fluid pump 32 drawing fluid 33 such as oil from a sump 34 and circulating the fluid 33 to the CVT 14 via channels, hoses, fittings, and other suitable conduit (not shown). In a possible embodiment, the primary and secondary clamping pressures (arrows $P_P$ and $P_S$, respectively) are independent of line pressure (arrow $P_L$). However, line pressure (arrow $P_L$) may be equal to secondary clamping pressure ($P_S$) in other embodiments.

The controller 50 may be configured as one or more computer devices having memory (M). The controller 50 may include hardware elements such as a processor (P), circuitry including but not limited to a timer, oscillator, analog-to-digital circuitry, digital-to-analog circuitry, proportional-integral-derivative control logic, a digital signal processor, and any necessary input/output devices and other signal conditioning and/or buffer circuitry. The memory (M) may include tangible, non-transitory memory such as read only memory, e.g., magnetic, solid-state/flash, and/or optical memory, as well as sufficient amounts of random access memory, electrically-erasable programmable read-only memory, and the like. The controller 50 may provide feedback-based ratio control of the CVT 14 under normal operating conditions, e.g., using proportional-integral or proportional-integral-derivative control logic.

As explained below, the controller 50 may selectively disable feedback-based ratio control in the event of a gross slip event of the CVT 14 until the gross slip reaches a calibrated acceptable level. Steps embodying the method 100 may be recorded in memory (M) and executed by the processor (P) in the overall control of the vehicle 10. The controller 50 may be programmed to track a number of occurrences of gross variator slip at a given CVT speed ratio, and to execute a control action with respect to the CVT 14 when the number of occurrences of slip exceeds a calibrated threshold number of occurrences.

The controller 50, which is in communication with the first and second variator actuators 28 and 30, receives a set of control input signals (arrow $CC_I$) as part of the method 100. The control input signals (arrow $CC_I$) may include, but are not limited to, the vehicle speed $N_{10}$ as reported, calculated, or measured by one or more wheels or transmission output speed sensors $S_{10}$, the pulley speeds ($\omega_P$, $\omega_S$), and a driver requested torque (arrow $T_{REQ}$). As is known in the art, the driver requested torque (arrow $T_{REQ}$) is typically determined by actions of a driver of the vehicle 10, such as via the present throttle request, braking levels, gear state, and the like. As part of the method 100, the controller 50 may request reduction in output torque from the engine 12, e.g., by transmitting an engine torque request signal (arrow 11) to an engine control module (ECM) 150. The ECM 150 may respond by transmitting engine control signals (arrow 111) to the engine 12 to achieve the requested reduction in output torque. Similarly, engine speed management can be used to control engine speed to achieve the proper speed ratio between the pulleys 18 and 20.

Figure 2:
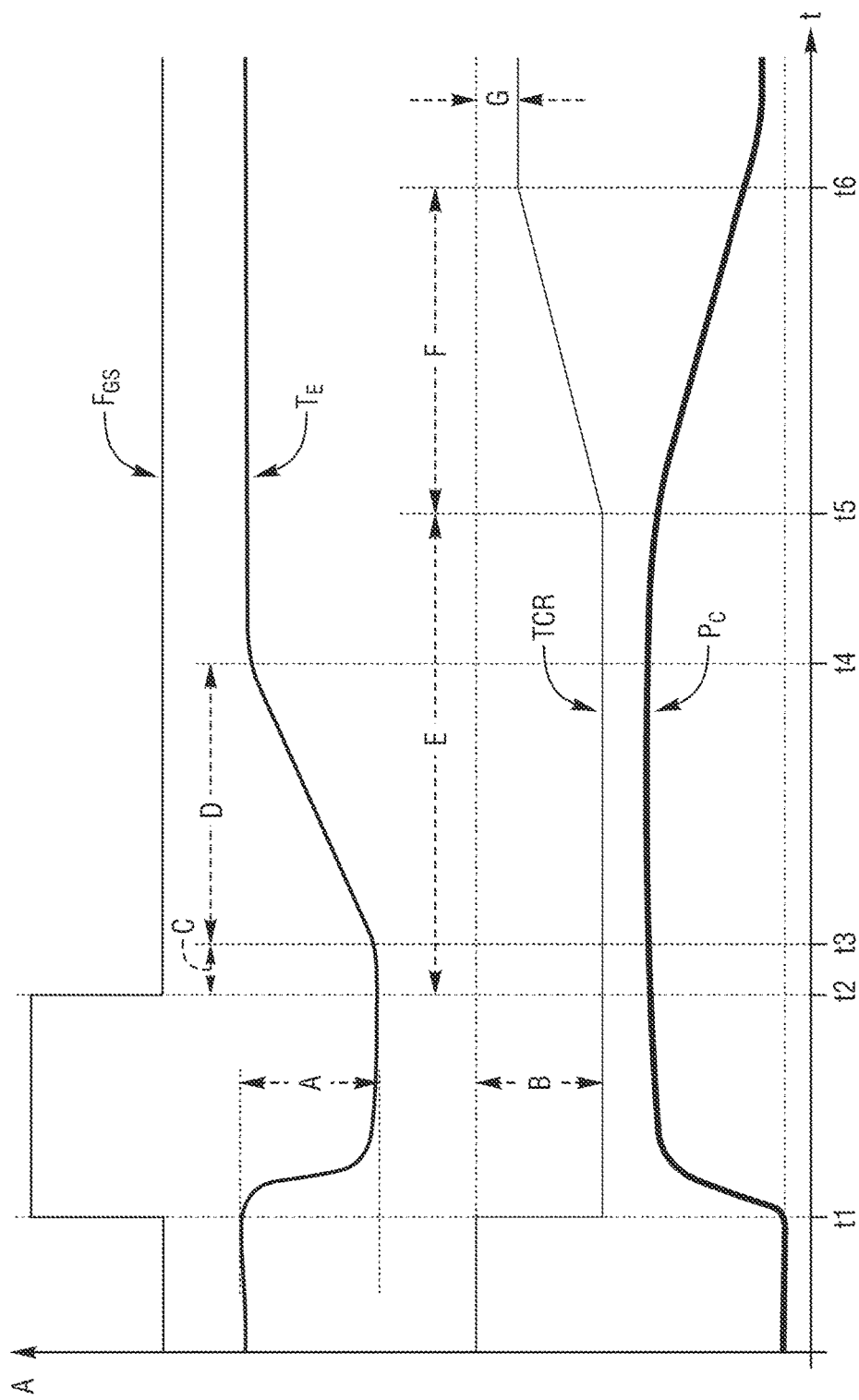
FIG. 2 is a time plot of changing amplitudes of different vehicle parameters illustrating variator gross slip condition and control actions executed by the controller shown in FIG. 1.
Figure 3:
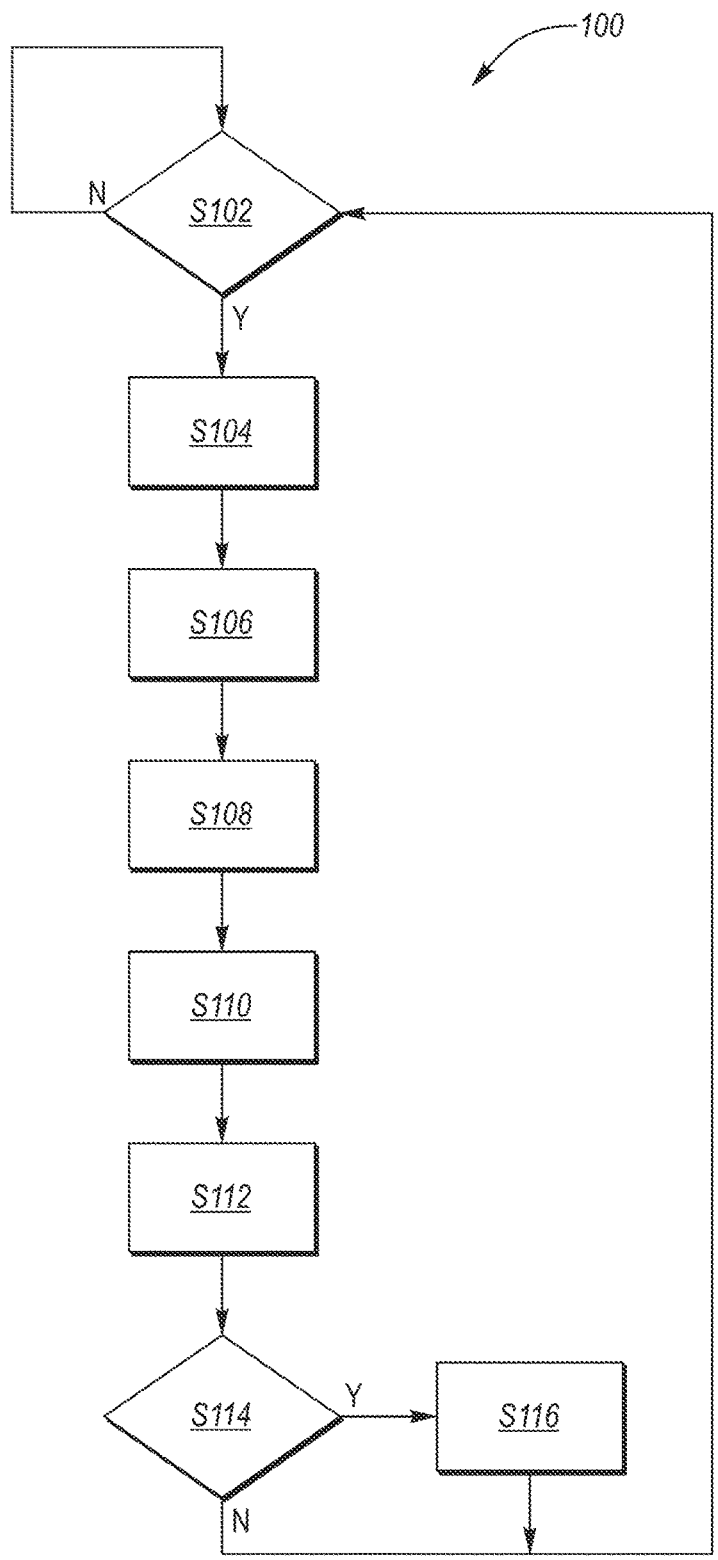
FIG. 3 is a flow chart describing an example embodiment of a method for mitigating gross slip of the variator assembly shown in FIG. 1.

Referring to FIGS. 2 and 3, the method 100 is executed by the controller 50 to mitigate the effects of slippage of the endless rotatable drive element 22 with respect to the variator pulleys 18 and 20, including commanding a specific torque response from the engine 12 and a specific speed ratio of the CVT 14, thus reducing or preventing degradation of the friction surfaces required for proper operation of the CVT 14. The individual steps of method 100 are shown in FIG. 3, while all referenced parameters or traces are depicted in the time plot of FIG. 2, with FIG. 2 depicting amplitude (A) on the vertical axis and time (t) on the horizontal axis.

After initialization, the method 100 commences at step S102. The controller 50 of FIG. 1 detects a gross variator slip event of the CVT 14. For instance, the controller 50 receives the primary and secondary pulley speeds (arrows $\omega_P$, $\omega_S$), calculates a speed difference between actual and commanded speeds in the primary and secondary pulley speeds (arrows $\omega_P$ and $\omega_S$), and compares the calculated speed difference to a calibrated threshold to determine if variator gross slip is present. Similarly, error between commanded and actual speed ratios can be used to determine slip. A bit flag may be activated when variator gross slip is detected, as indicated between t1 and t2 of FIG. 2 by trace $F_{GS}$. The controller 50 proceeds to step S104 when variator gross slip is detected.

At step S104 of FIG. 3, the controller 50 activates a control logic state in which the controller 50 of FIG. 1 is given permission to execute the various slip mitigation control actions described herein. Step S104 may entail setting a status in logic of the controller 50 indicative of such permission, such as a corresponding bit flag. The controller 50 may temporarily disable feedback-based ratio control of the CVT 14 until the completion of method 100 when gross slip finally reaches a calibrated acceptable level as set forth below. The method 100 proceeds to step S106 when slip control is active.

At step S106 the controller 50 requests a reduced level of output torque from the engine 12 in a managed fashion via communication with the ECM 150 of FIG. 1 and the transmitting of the engine control signals (arrow 111). This limits the amount of torque delivered into the variator assembly. The reduced level of engine torque may be sustained for a calibrated minimal amount of time until variator gross slip is sufficiently controlled. This action is depicted as trace $T_E$ in FIG. 2, which decreases (double-headed arrows A) at t1 and is sustained for a calibrated duration (double-headed arrow C) after t2 once the gross slip condition has cleared. Thus, at t3 engine torque (trace $T_E$) is permitted to increase over a duration (double-headed arrow D) to its starting level at a calibrated rate, i.e., A/D, which is reached at time t4. The method 100 may then proceed to step S108.

Step S108 includes increasing a clamping force of the primary and secondary variator pulleys by a calibrated amount of clamping torque offset. That is, at the onset of a gross slip event at t1 of FIG. 2 the controller 50 decreases the torque capacity ratio (trace TCR) of the CVT 14 as indicated by double-headed arrow B, i.e., the required clamping force divided by the currently commanded clamping force. The torque capacity ratio (trace TCR) may be decreased by increasing the clamping force, as indicated by trace $P_C$ of FIG. 2, corresponding to arrow $P_C$ of FIG. 1, by a calibrated amount, i.e., the clamping torque offset, and holding the new clamping force (trace $P_C$) for a calibrated duration (double-headed arrow E) after the slip event has cleared, at which point (t5) the torque capacity ratio (trace TCR) is smoothly returned over a calibrated duration t5 to t6 (double headed arrow F) to its normal calibrated level, less a calibrated torque offset (double-headed arrow G). The intent of step S108 is to reduce the likelihood of recurrence of slippage at the same CVT speed ratio. The method 100 then proceeds to step S110.

At step S110, the controller 50 may temporarily disable selection of the current CVT speed ratio if the gross slip condition is not cleared by performance of steps S106 and S108. The method 100 then proceeds to step S112.

At step S112, the controller 50 may increment a slip counter in memory (M) for the commanded CVT speed ratio. That is, the controller 50 tracks the number of occurrences of a gross slip event at each speed ratio or band of speed ratios of the CVT 14, e.g., in a lookup table indexed by CVT speed ratios, such that for each CVT speed ratio the controller 50 can quickly determine how many times the endless rotatable drive element 22 has already slipped above a minimal threshold permissible slip level. The method 100 then proceeds to step S114.

Step S114 includes determining if the slip counter of step S112 reaches a threshold count. If so, the method 100 proceeds to step S116. Otherwise the method 100 is finished and resumes anew with step S102.

Step S116 includes updating a clamp torque offset table preserved across multiple ignition cycles. The result of step S116 is an increase in clamp torque offset within a band of variator speed ratios in a manner that is proportional to the number of variator gross slip events. That is, the intent of step S116 is that with each occurrence of slip at a particular CVT speed ratio, the clamp torque offset to be applied is increased by a calibrated amount. The new clamp torque offset is thereafter applied from the updated table during normal operation whenever the speed ratio is commanded, i.e., to provide a calibrated additional amount of clamping torque. The method 100 is continued iteratively or adaptively over time. With each successive occurrence of gross slip at a torque ratio, the clamp torque offset is increased. That is, at a second occurrence of slip at a given torque ratio or speed ratio, the controller 50 uses a larger offset than a first occurrence, with a third occurrence receiving a larger offset than the second occurrence, and so forth. The method 100 is finished and resumes anew with step S102.

While the best modes for carrying out the disclosure have been described in detail, those familiar with the art to which this disclosure relates will recognize various alternative designs and embodiments for practicing the disclosure within the scope of the appended claims.

The invention claimed is:

1. A continuously variable transmission (CVT) comprising:
   an input member;
   an output member;
   a variator assembly having a primary variator pulley operable for receiving an input torque via the input member, a secondary variator pulley operable for transmitting an output torque via the output member, and an endless rotatable drive element in frictional engagement with the primary and secondary variator pulleys;
   first and second speed sensors operable for measuring a respective rotational speed of the primary and secondary variator pulleys; and
   a controller programmed to detect slip of the endless rotatable drive element with respect to the primary and secondary variator pulleys using the measured rotational speeds, and in response to the detected slip, to request a reduction in the input torque by a calculated amount over a calibrated duration until a level of the detected slip reaches a calibrated slip level, and to temporarily disable feedback-based ratio control of the CVT until the slip reaches the calibrated acceptable level.

2. The CVT of claim 1, wherein the controller is programmed, at the onset of the detected slip, to command a decrease in a torque capacity ratio of the CVT.

3. The CVT of claim 1, wherein the controller includes a counter, and is programmed to track a number of occurrences of variator slip at a given speed ratio, and to execute a control action with respect to the CVT when the number of occurrences exceeds a calibrated threshold number of occurrences.

4. The CVT of claim 3, wherein the control action includes preventing selection of the given speed ratio.

5. The CVT of claim 1, wherein the controller is operable for increasing a torque offset in a band of variator speed ratios around the speed ratio at which the slip event occurs.

6. A method for mitigating effects of slip in a continuously variable transmission (CVT), the method comprising:
   detecting slip of an endless rotatable drive element of the CVT with respect to primary and secondary variator pulleys of the CVT;
   requesting, via a controller, a reduction in an input torque to the CVT by a calculated amount over a calibrated duration;
   maintaining the reduction in the input torque until a level of the detected slip reaches a calibrated slip level; and
   temporarily disabling feedback-based ratio control of the CVT until the slip reaches the calibrated acceptable level.

7. The method of claim 6, further comprising, at the onset of the detected slip, commanding a decrease in a torque capacity ratio of the CVT via the controller, including increasing a clamping force of the primary and secondary variator pulleys.

8. The method of claim 6, wherein the controller includes a counter, further comprising tracking a number of occurrences of variator slip at a given speed ratio via the counter, and executing a control action via the controller with respect to the CVT when the number of occurrences exceeds a calibrated threshold number of occurrences.

9. The method of claim 8, wherein executing the control action includes preventing selection of the given speed ratio.

10. The method of claim 6, further comprising increasing a torque offset around the speed ratio at which the slip event occurs.

11. A vehicle comprising:
   an internal combustion engine;
   a continuously variable transmission (CVT) comprising:
      an input member;
      an output member;
      a variator assembly having a primary variator pulley operable for receiving an input torque from the engine via the input member, a secondary variator pulley operable for transmitting an output torque via the output member, and an endless rotatable drive element in frictional engagement with the primary and secondary variator pulleys;
      first and second speed sensors operable for measuring a respective rotational speed of the primary and secondary variator pulleys; and
   a controller programmed to detect slip of the endless rotatable drive element with respect to the primary and secondary variator pulleys using the measured rotational speeds, and in response to the detected slip, to request a reduction in the input torque by a calculated amount over a calibrated duration until a level of the detected slip reaches a calibrated slip level, and to temporarily disable feedback-based ratio control of the CVT until the slip reaches the calibrated acceptable level.

12. The vehicle of claim 11, wherein the controller is programmed, at the onset of the detected slip, to command a decrease in a torque capacity ratio of the CVT by increasing a clamping force of the primary and secondary variator pulleys.

13. The vehicle of claim 11, wherein the controller includes a counter, and is programmed to track a number of occurrences of variator slip at a given speed ratio, and to execute a control action with respect to the CVT when the number of occurrences exceeds a calibrated threshold number of occurrences.

14. The vehicle of claim 11, wherein the control action includes preventing selection of the given speed ratio.

15. The vehicle of claim 11, wherein the controller is operable for increasing a torque offset in a band of variator speed ratios around the speed ratio at which the slip event occurs.

* * * * *